US005502605A

United States Patent [19]
Myokan

[11] Patent Number: 5,502,605
[45] Date of Patent: Mar. 26, 1996

[54] SPINDLE MOTOR OF DISK APPARATUS INCLUDING AN IMPROVED SPINDLE HUB

[75] Inventor: Kenichi Myokan, Kawasaki, Japan

[73] Assignee: Fujitsu Limited, Kawasaki, Japan

[21] Appl. No.: 317,120

[22] Filed: Oct. 3, 1994

[30] Foreign Application Priority Data

Dec. 28, 1993 [JP] Japan .................. 5-349714

[51] Int. Cl.$^6$ .......................... G11B 17/02; G11B 5/016
[52] U.S. Cl. .................. 360/99.08; 360/98.07; 360/99.04
[58] Field of Search ............... 360/99.08, 98.07, 360/99.04; 369/270, 271

[56] References Cited

U.S. PATENT DOCUMENTS

| | | | |
|---|---|---|---|
| 4,905,110 | 2/1990 | Krum et al. | 360/99.08 |
| 5,216,557 | 6/1993 | Elsaesser et al. | 360/99.08 |
| 5,291,357 | 3/1994 | Uda | 360/99.08 |

FOREIGN PATENT DOCUMENTS

| | | | |
|---|---|---|---|
| 3-29160 | 2/1991 | Japan | 360/99.08 |
| 5-144168 | 6/1993 | Japan | 369/270 |

*Primary Examiner*—John H. Wolff
*Attorney, Agent, or Firm*—Greer, Burns & Crain, Ltd.

[57] ABSTRACT

Disclosed are a spindle motor for rotating a disk and a magnetic disk apparatus using this motor. This spindle motor comprises: a spindle shaft secured to a housing for the disk apparatus; a spindle hub including a flange having its bottom surface to which an inner peripheral surface of said disk is fixed and rotatably attached to the spindle shaft; a ring-like permanent magnet fitted to the spindle hub; a plurality of stators attached in concentric positions in face-to-face relationship with the ring-like permanent magnet; and a plurality of armature coils wound on each of the stators. With this construction, an internal space of the spindle hub can be enlarged, and, therefore, a diameter of the permanent magnet can be increased. Besides, the number of windings of the armature coil can be also increased. This leads to an increment in torque constant, and the motor of lower dissipation power is attainable.

14 Claims, 7 Drawing Sheets

SPINDLE MOTOR OF DISK APPARATUS INCLUDING AN IMPROVED SPINDLE HUB

BACKGROUND OF THE INVENTION

1. Field of the Invention

The present invention relates to a spindle motor, of a disk apparatus, for rotating a disk and to a magnetic disk apparatus using this motor.

2. Description of the Related Art

In recent years, with the spread of the portable note-like personal computer, a magnetic disk apparatus is utilized as a file apparatus mounted in this machine. Down-sizing, a reduction in thickness and low dissipation of power the magnetic disk apparatus mounted in this type of machine are strongly demanded. For thinning the magnetic disk apparatus, it is demanded that a spindle motor for rotating the magnetic disk be reduced in height.

FIG. 7 is a view of the prior art to aid in the following explanation.

The present applicant made an application for a technology of thinning the spindle motor (Specification of Japanese Patent Application No. 4-220379, filed on Aug. 19, 1992). This spindle motor will be described with reference to FIG. 7.

The numeral 1 designates a housing for a magnetic disk apparatus. A spindle shaft 2 is secured to upper and lower surfaces of this housing 1. A spindle hub 5 is rotatably attached to this spindle shaft 2 via an upper bearing 3 and a lower bearing 4. A spacer 6 holds a spacing between the upper bearing 3 and the lower bearing 4.

A diameter of a flange 5-1 of the spindle hub 5 is slightly smaller than a minor diameter of a magnetic disk 7. An innermost peripheral portion of the magnetic disk 7 is secured by bonding onto an outer cylindrical member 5-2 of the spindle hub 5 with being guided by the flange 5-1.

A ring-like permanent magnet 8 is mounted the interior of the spindle hub 5. A plurality of stators 9 are bonded to the housing 1. An armature coil 10 is wound on a proximal portion of each of these stators 9. This armature coil 10 is connected to a printed circuit board 11 and supported thereon.

The magnetic field system of this spindle motor will be explained next. The spindle hub 5 is composed of a non-magnetic material such as aluminum, etc. The permanent magnet 8 is composed of a ring-like polar anisotropic magnet. That is, the permanent magnet 8 is, e.g., 8-pole-magnetized outward in the radial direction of the magnet. The housing 1 and the stators 9 are constructed of soft steels and form a magnetic path (yoke). Accordingly, the magnetic flux of the N-pole of the permanent magnet 8 and the S-pole adjacent thereto passes through the interior of the magnet, the stator 9 and the housing 1.

Next, the operation of the construction discussed above will be described. An unillustrated control circuit sequentially flows the electric current across the armature coils 10, and the stators 9 are thereby turned out electromagnets. Accordingly, driving forces are produced in the magnetic gaps between the permanent magnet 8 and the stators 9, thereby rotating the permanent magnet 8. That is, a motor of the brushless DC motor type is formed. With this operation, the spindle hub 5 is rotated about the spindle shaft 2, and the disk 7 is rotated at the desired number of revolutions.

There arise, however, the following problems inherent in the prior art.

Generally, the dissipation power at the predetermined number of revolutions is proportional to the ratio of the load torque loss to the torque constant. Namely, the dissipation power is expressed by the following formula:

Dissipation Power=Power Supply Voltage×Dissipation Current=Power Supply Voltage×(Load Torque Loss/Torque Constant)

Accordingly, it is required for reducing the dissipation power of the motor that the motor be constructed to increase the torque constant. Also, the load torque loss is the total sum of the windage loss (loss caused when the rotor rotates through the ambient air), a mechanical loss (frictional loss in the bearing) and the iron loss (eddy-current loss and hysteresis loss).

This torque constant is proportional to the number of conductors per armature coil and the quantity of the magnetic flux produced by the magnetic field system. That is: Torque Constant∝Number of Conductors×Magnetic Flux Quantity. The quantity of the magnetic flux produced by this magnetic field system, simply, increases in proportion to the equivalent sectional area S of the permanent magnet 8. The equivalent sectional area S of the permanent magnet 8 is given by the following formula:

S=π×Magnet Average Radius×Magnet Height/Number of Poles

The above-mentioned motor based on the conventional construction, however, presents the following problems. For attaining the down-sizing and the reduction in thickness, the permanent magnet 8, the stators 9 and the armature coils 10 are arranged inwardly of the flange 5-1, on the spindle hub 5, which guides the disk 7. With this arrangement, it is difficult to increase an average diameter of the permanent magnet 8. Hence, the quantity of the magnetic flux produced by the magnetic field system is also small. This makes it difficult to produce a motor exhibiting a large torque constant while requiring a lower quantity of dissipation power.

SUMMARY OF THE INVENTION

It is a primary object of the present invention to down-size and reduce the thickness of a spindle motor of a disk apparatus, operating with low dissipation power and also to provide a magnetic disk apparatus using this motor.

It is another object of the present invention to provide a spindle motor of a disk apparatus, operating by low dissipation power with an increase in torque constant, and a magnetic disk apparatus using this motor.

It is still another object of the present invention to provide a spindle motor of a disk apparatus, operating with low dissipation power with an increase in torque constant and with a simple construction, and a magnetic disk apparatus using this motor.

To accomplish the objects given above, according to one aspect of the present invention, there is provided a spindle motor of a disk apparatus, comprising: a spindle shaft secured to a housing for the disk apparatus; a spindle hub including a flange having its bottom surface to which an inner peripheral surface of said disk is fixed and rotatably attached to the spindle shaft; a ring-like permanent magnet fitted to the spindle hub; a plurality of stators attached in concentric positions in face-to-face relationship with the ring-like permanent magnet; and a plurality of armature coils wound on each of the stators.

According to another aspect of the present invention, there is provided a magnetic disk apparatus comprising: a magnetic disk; a magnetic head for writing and reading data to and from the magnetic disk; an actuator for moving the magnetic head in a radial direction of the magnetic disk; a spindle shaft secured to a housing for the magnetic disk apparatus; a spindle hub including a flange having its bottom surface to which an inner peripheral surface of the disk is fixed and rotatably attached to the spindle shaft; a ring-like permanent magnet fitted to the spindle hub; a plurality of stators attached in concentric positions in face-to-face relationship with the ring-like permanent magnet; and a plurality of armature coils wound on each of the stators.

According to this invention, the disk is fixed to the bottom surface of the flange of the spindle hub, and therefore, even when mounting a disk having the same inside diameter, the radius of the flange can be increased. The internal space of the spindle hub can be thereby enlarged. With this arrangement, the permanent magnet and the stators can be disposed more outwardly than in the prior art but still within the interior of the spindle hub.

Accordingly, the average diameter of the permanent magnet can be increased by increasing its minor and major diameters. This increases the magnetic flux produced by the magnetic field system. This also makes it possible to proportionally increase the torque constant of the motor. Additionally, a motor requiring a smaller quantity of dissipation power may also be utilized.

Further, the internal space of the spindle hub can be enlarged, and, hence, the stators can be arranged more outwardly. With this arrangement, more armature coils can be wound. This also leads to an increase in the magnetic flux produced by the magnetic field system. Therefore, the torque constant of the motor proportionally increases, and a motor requiring less dissipation power can be provided.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of this invention, and together with the general description given above and the detailed description of the preferred embodiments given below, serve to explain the principle of the invention, in which.

DETAILED DESCRIPTION OF THE PREFERRED EMBODIMENTS

Figure 1:
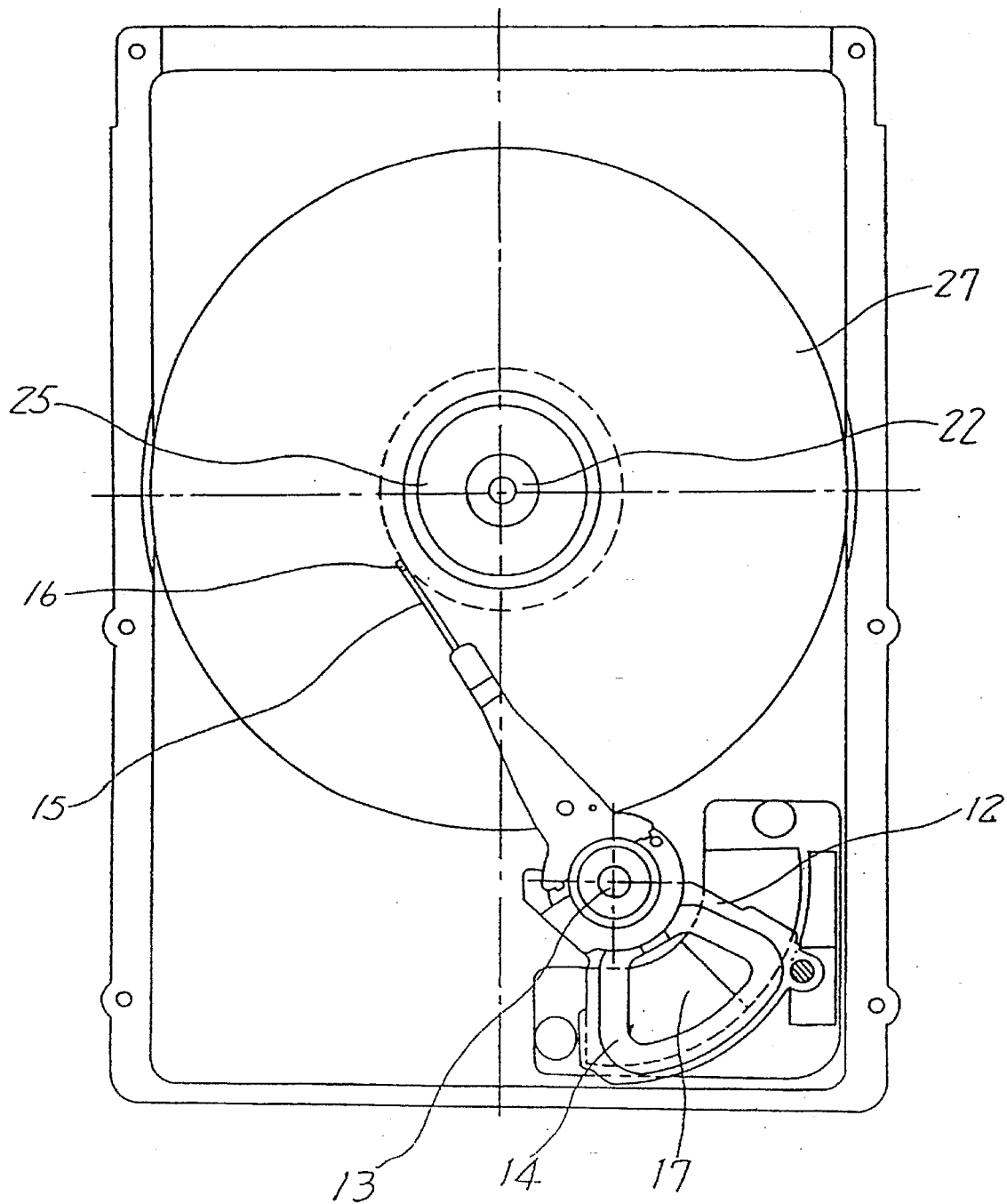
FIG. 1 is a front view of a magnetic disk apparatus in one embodiment of the present invention.
Figure 2:
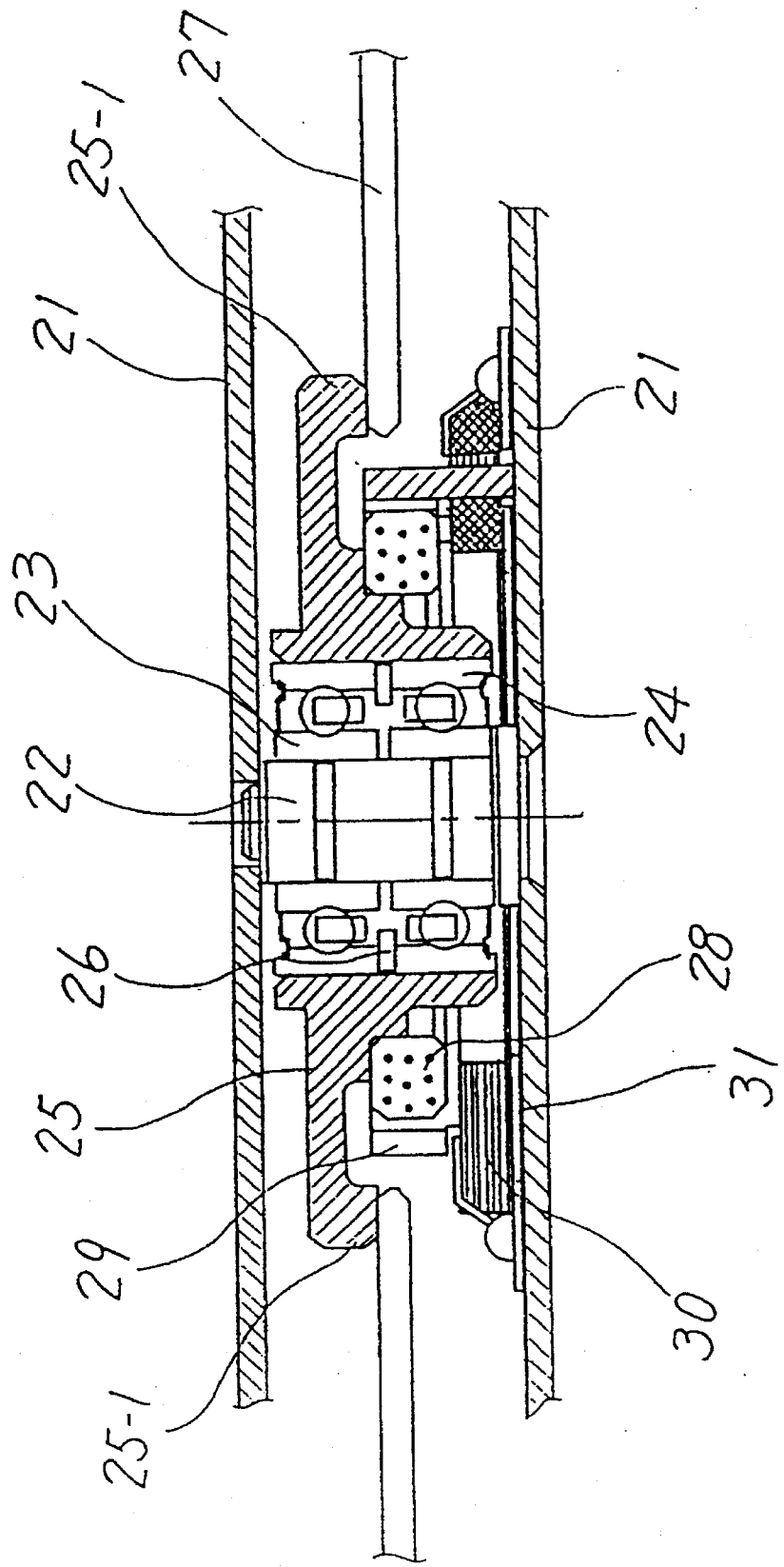
FIG. 2 is a sectional view illustrating one embodiment of the present invention.
Figure 3:
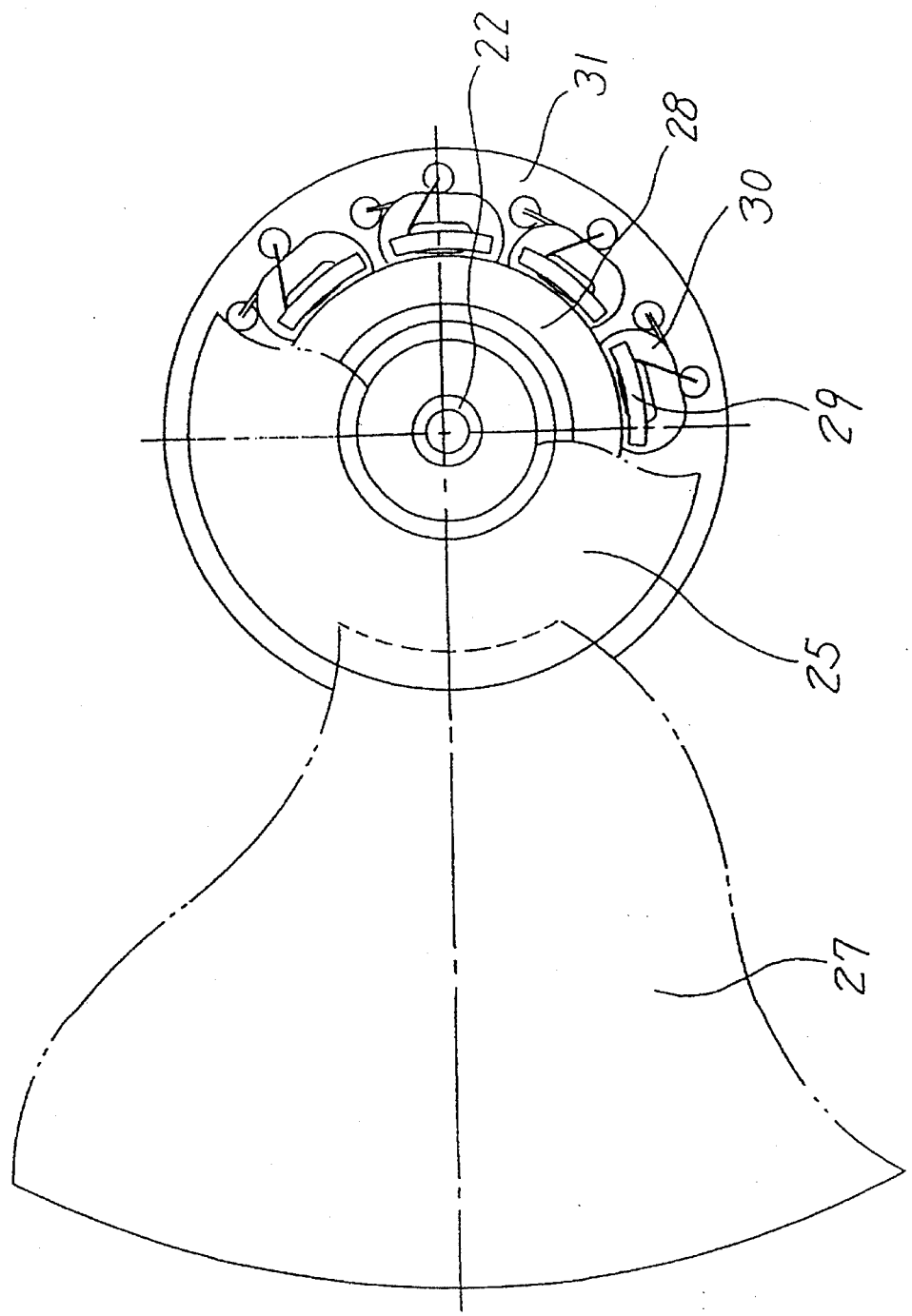
FIG. 3 is a top view showing the construction of FIG. 2.

FIG. 1 is a front view illustrating a magnetic disk apparatus in one embodiment of the present invention. FIG. 2 is a sectional view illustrating a spindle motor in one embodiment of this invention. FIG. 3 is a top view showing the construction of FIG. 2.

As illustrated in FIG. 1, the magnetic disk apparatus includes a magnetic disk 27 rotated by spindle motors 22, 25 and an actuator 12 rotating about a rotary shaft 13. The magnetic disk apparatus also includes a VCM coil 14 provided at a rear portion of the actuator 12, a spring arm 15 provided at a front end of the actuator 12 and having a magnetic head 16 at the tip thereof and further a magnetic circuit 17 provided corresponding to the VCM coil 14.

In this magnetic disk apparatus, the magnetic disk 27 is rotated by the spindle motors 22, 25. Then, an electric current flows across the VCM coil 14, thereby rotationally driving the actuator 12. With this operation, the magnetic head 16 at the front end of the actuator 12 is moved in a radial direction with respect to the magnetic disk 27 and located upon a desired track on the magnetic disk 27. Thereafter, the magnetic head 16 reads or writes the data from or to the relevant track.

As shown in FIG. 2, the numeral 21 designates a housing for the magnetic disk apparatus. A spindle shaft 22 is secured to the upper and lower portions of this housing 21. A spindle hub 25 is rotatably attached to this spindle shaft 22 via an upper bearing 23 and a lower bearing 24. A spacer 26 holds the spacing between the upper bearing 23 and the lower bearing 24.

The spindle hub 25 has a flange 25-1. The outer diameter of this flange 25-1 is slightly larger than the minor diameter of the magnetic disk 27. The innermost peripheral surface of the magnetic disk 27 is secured by bonding to the bottom surface of the flange 25-1 of the spindle hub 25. That is, the spindle hub 25 is provided with no conventional outer cylinder.

On the other hand, a ring-like permanent magnet 28 is attached to an inner peripheral portion of the spindle hub 25. A plurality of stators 29 are bonded to the housing 21. As illustrated in FIG. 3, nine stators 29 are provided in a face-to-face relationship with the permanent magnet 28 along the periphery of the spindle shaft 22. An armature coil 30 is wound around proximal portions of each of these stators 29. This armature coil 30 is connected to a printed circuit board 31 and supported thereon.

The magnetic field system of this spindle motor will be explained next. The spindle hub 25 is composed of a nonmagnetic material such as aluminum, etc. The permanent magnet 28 is composed of a ring-like polar anisotropic magnet and is, e.g., 8-pole-magnetized outwardly in the radial direction of the magnet. The housing 21 and the stators 29 are constructed of soft steels and form a magnetic path (yoke). Accordingly, the magnetic flux of the N-pole of the permanent magnet 28 and the S-pole adjacent thereto passes through the interior of the magnet, the stator 29 and the housing 21.

Next, the operation of the construction discussed above will be described. An unillustrated control circuit sequentially flows the electric current across the armature coils 30, and the stators 29 are thereby turned out electromagnets. Accordingly, driving forces are produced in magnetic gaps between the permanent magnet 28 and the stators 29, thereby rotating the permanent magnet 28. That is, a forth motor of a brushless DC motor type is formed. With this operation, the spindle hub 25 is rotated about the spindle shaft 22, and the disk 27 is rotated at a desired number of revolutions.

In accordance with this embodiment, the spindle motor 25 is not provided with the outer cylinder for guiding the magnetic disk 27. Then, the innermost peripheral surface of the magnetic disk 27 is fixed to the bottom surface of the flange 25-1 of the spindle hub 25, and, therefore, a radius of the flange 25-1 can be increased. For this reason, an internal space in the spindle hub 25 can be enlarged.

Hence, the permanent magnet 28 and the stators 29 that are housed in the interior thereof can be arranged more outside than in the prior art. Accordingly, an average diameter of the permanent magnet 28 can be also increased. This brings about an increment in terms of a quantity of the magnetic flux produced by the magnetic field system. In addition to this, the stators 29 can be disposed more outside, and, correspondingly, a larger quantity of the armature coil 30 can be wound. A torque constant of the motor is thereby increased. This conduces to a reduction of dissipation power of the motor.

Figure 4:
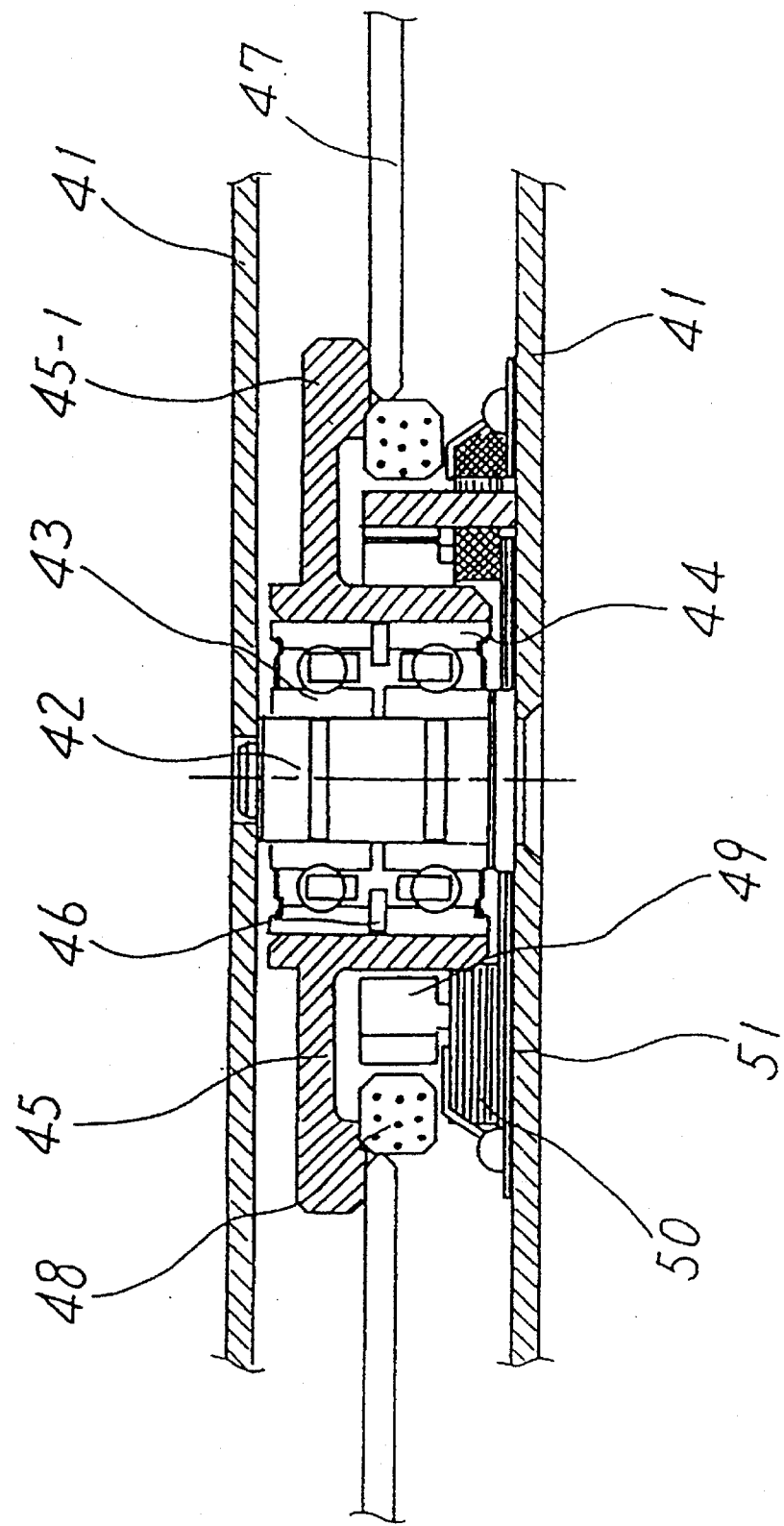
FIG. 4 is a sectional view showing an example of a modification of the present invention.
Figure 5:
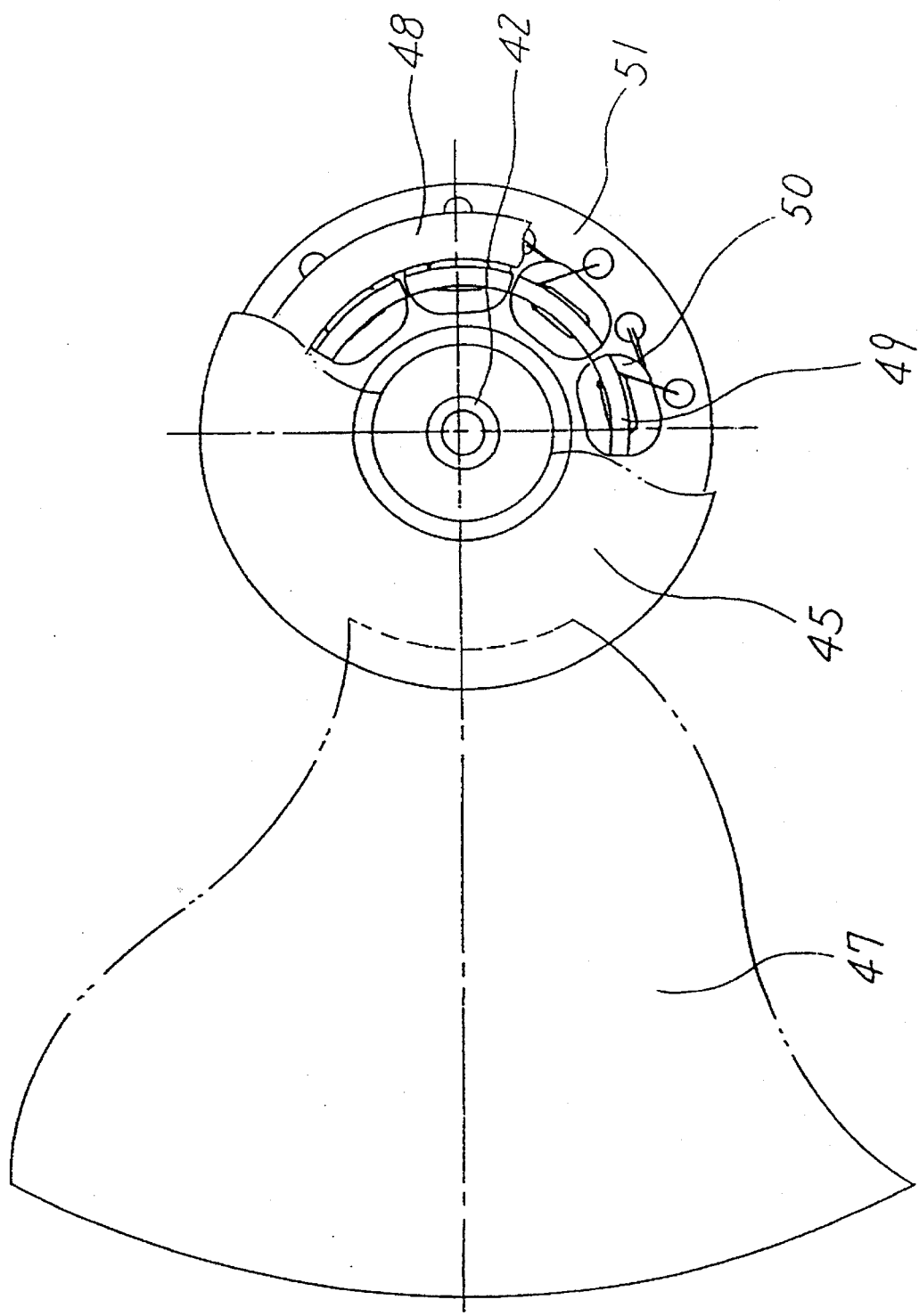
FIG. 5 is a top view illustrating the construction of FIG. 4.
Figure 6:
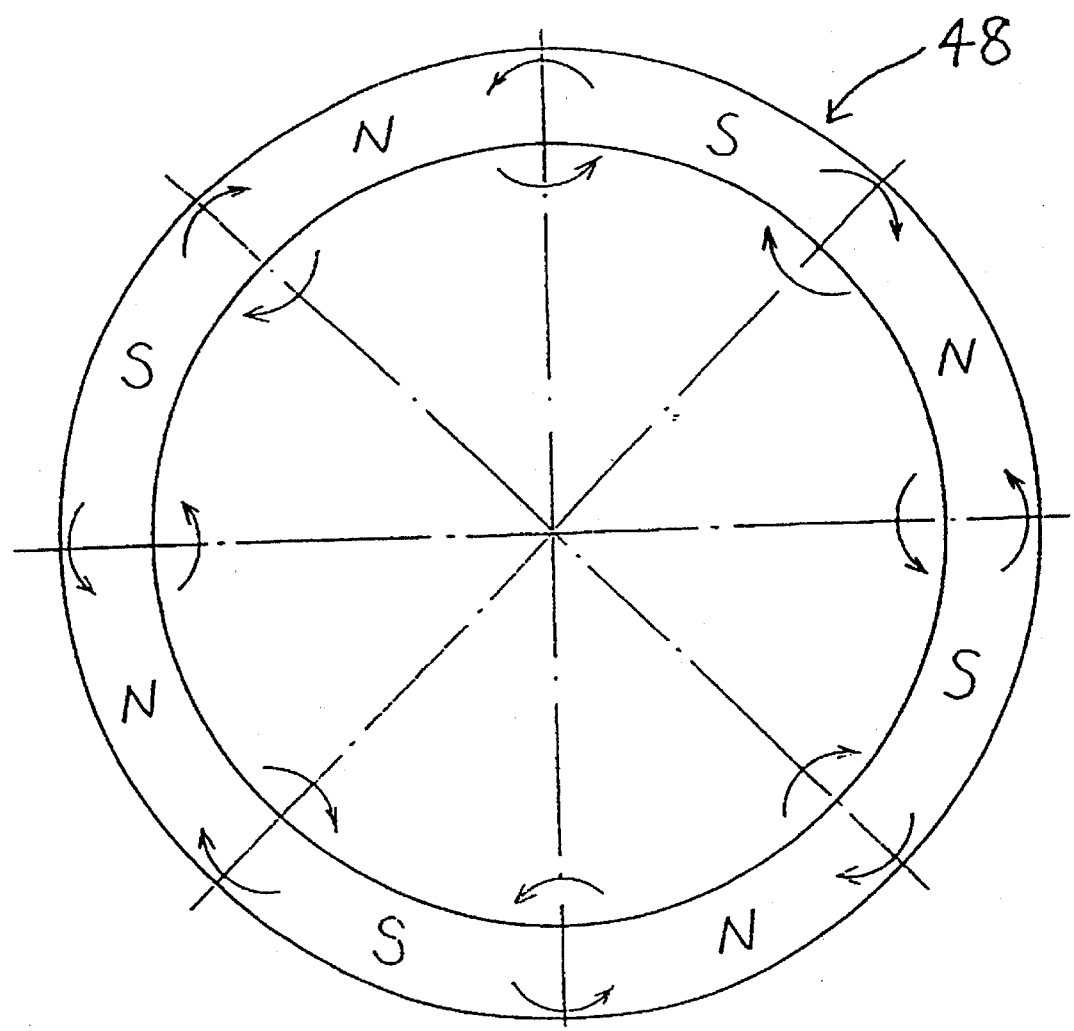
FIG. 6 is an explanatory view showing a permanent magnet in the construction of FIGS. 4 and 5.
Figure 7:
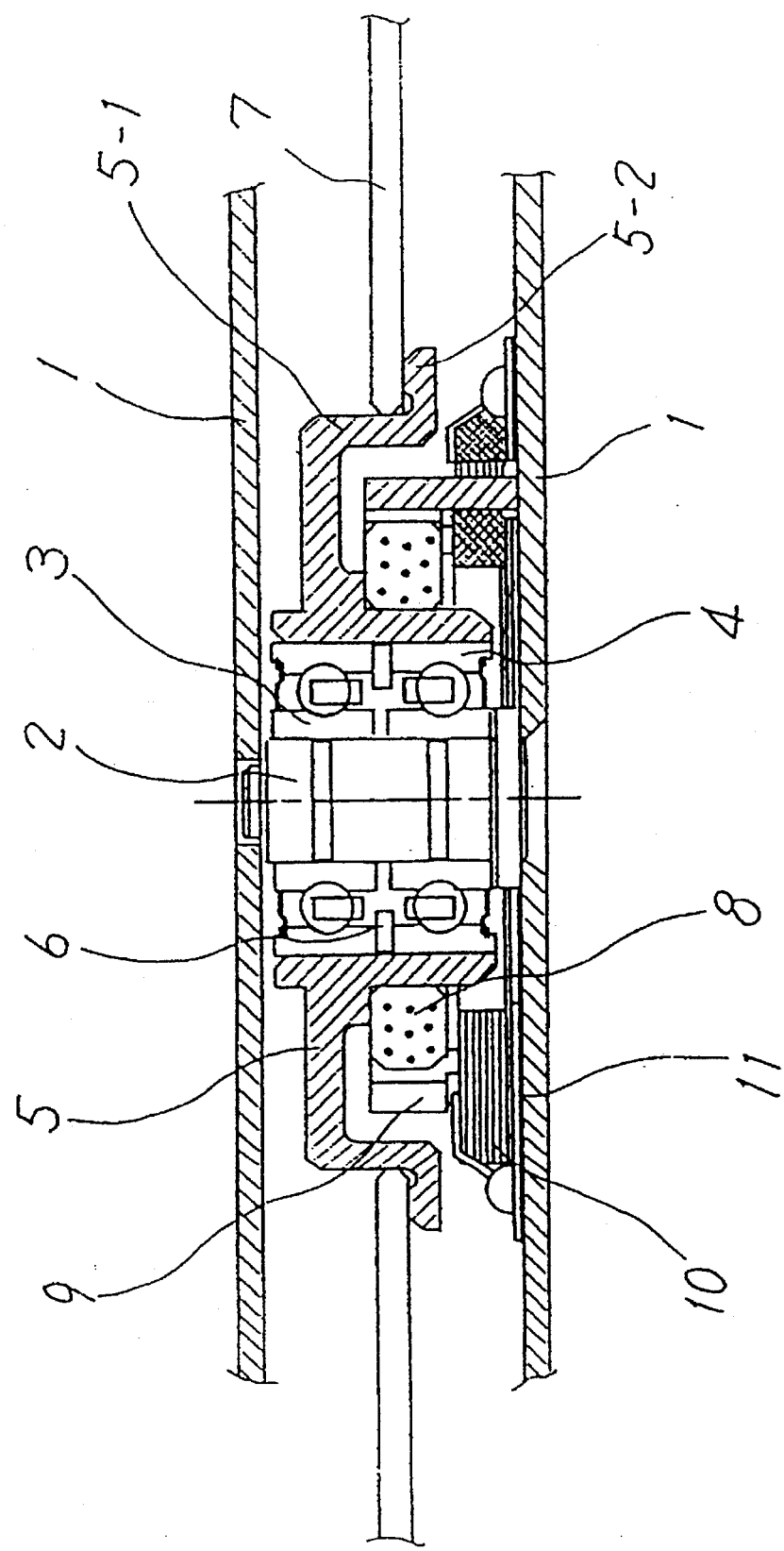
FIG. 7 is an explanatory view of the prior art.

FIG. 4 is a sectional view illustrating the spindle motor in an example of modification of the present invention. FIG. 5 is a top view of the construction of FIG. 4. FIG. 6 is an explanatory magnet in the construction of FIGS. 4 and 5.

As depicted in FIG. 4, the numeral 41 represents a housing for the magnetic disk apparatus. The spindle shaft 42 is secured to the upper and lower portions of this housing 41. A spindle hub 45 is rotatably attached to this spindle shaft 42 via an upper bearing 43 and a lower bearing 44. A spacer 46 holds a spacing between the upper bearing 43 and the lower bearing 44.

The spindle hub 45 has a flange 45-1. The diameter of this flange 45-1 is slightly larger than the minor diameter of the magnetic disk 47. The innermost peripheral surface of the magnetic disk 47 is secured by bonding to the bottom surface of the flange 45-1 of the spindle hub 45. That is, the spindle hub 45 is provided with no conventional outer cylinder.

On the other hand, a ring-like permanent magnet 48 is attached to the bottom surface of an outer periphery of the flange 45-1. A plurality of stators 49 are bonded to the housing 41. As illustrated in FIG. 5, nine pieces of stators 49 are provided in a face-to-face relationship with the permanent magnet 48 along the periphery of the spindle shaft 42. An armature coil 50 is wound on each of proximal portions of each of these stators 49. This armature coil 50 is connected to a printed circuit board 51 and supported thereon.

The magnetic field system of this spindle motor will be described next. The spindle hub 45 is composed of a nonmagnetic material such as aluminum, etc. The permanent magnet 48 is composed of a ring-like polar anisotropic magnet. Namely, the permanent magnet 48 is, e.g., 8-pole-magnetized inward in the radial direction of the magnet. The housing 41 and the stators 49 are constructed of soft steels and form a magnetic path (yoke). Accordingly, the magnetic flux of the N-pole of the permanent magnet 48 and the S-pole adjacent thereto passes through the interior of the magnet, the stator 49 and the housing 41.

Next, the operation of the construction discussed above will be described. An unillustrated control circuit sequentially flows the electric current across the armature coils 50, and the stators 49 are thereby turned out electromagnets. Accordingly, driving forces are produced in magnetic gaps between the permanent magnet 48 and the stators 49, thereby rotating the permanent magnet 48. That is, a motor of the brushless DC motor type is formed. With this operation, the spindle hub 45 is rotated about the spindle shaft 42, and the disk 47 is rotated at the desired number of revolutions.

In accordance with this embodiment, the spindle hub 45 is not provided with an outer cylinder for guiding the magnetic disk 47. Then, the magnetic disk 47 is fixed to the bottom surface of the outer periphery of the flange 45-1 of the spindle hub 45, and, hence, the radius of the flange 45-1 can be increased. For this reason, the internal space in the spindle hub 45 can be enlarged.

Hence, the permanent magnet 48 housed in the interior thereof can be disposed more outwardly than in the prior art. Besides, the permanent magnet 48 is disposed outwardly of the stators 49. Accordingly, the average diameter of the permanent magnet 48 can be further increased. This brings the magnetic flux produced by the magnetic field system. The torque constant of the motor is thereby increased. This reduces the dissipation power of the motor.

Further, as illustrated in FIG. 6, the permanent magnet 48 is composed of the ring-like polar anisotropic magnet and is S-pole-magnetized inwardly in the radial direction of the magnet. For this reason, the magnetic force of the permanent magnet 48 does not influence the magnetic disk 47 provided outwardly of the permanent magnet 48.

Accordingly, even when the permanent magnet 48 is provided outwardly of the stators 49, the data on the magnetic disk 47 is not influenced by magnet 48. Therefore, the data on the magnetic disk 47 can be protected from the magnetic force of the permanent magnet 48. Also, the torque of the motor can be maximized by increasing the diameter of the permanent magnet 48 at the maximum without exerting the influence on the data on the magnetic disk 47.

In the Figure, the diameter of the permanent magnet 48 can be increased until the permanent magnet 48 touches the inside diameter of the magnetic disk 47. Further, when the disk 47 is constructed as a magneto-optical disk, the same effects can be exhibited.

The present invention may take the following modifications other than the embodiments discussed above. First, the above-discussed embodiments have dealt with the disk as a magnetic disk but entail applications to a magneto-optical disk, an optical disk and other disks. Second, the disk is fixed by bonding to the bottom surface of the flange of the spindle hub, but other fixing methods are also available. Third, in one embodiment described above, the permanent magnet may not be a polar anisotropic magnet. Further, in the example of modification also, if the disk is non-magnetic, the permanent magnet may not be polar anisotropic magnet.

The present invention has been discussed by way of the embodiments but may take a variety of modifications within the scope of the gist of the present invention. These modifications are not eliminated from the scope of the present invention.

As discussed above, according to the present invention, the disk is fixed to the bottom surface of the flange of the spindle hub, and, therefore, the internal space of the spindle hub can be enlarged. This leads to the increase in terms of the diameter of the permanent magnet. Hence, even when taking a construction to thin the apparatus, the torque of the motor can be increased, and it is therefore possible to offer the motor requiring a less amount of dissipation power. Further, the apparatus can be attained with a simple construction and actualized readily at low costs.

What is claimed is:

1. A spindle motor for rotating a disk within a disk apparatus comprising:

a spindle shaft adapted to be secured to a housing said spindle shaft extending between an upper end portion and a lower end portion;

a spindle hub rotatably attached to said spindle shaft, said spindle hub including a flange, said flange being defined by an upper surface, a lower surface, an outer diameter, and an internal space located radially inwardly of said outer diameter adjacent said lower surface;

a disk defined by a minor diameter and a major diameter, wherein said minor diameter is less than both said major diameter and said outer diameter of said flange, and said disk being attached to said lower surface of said flange;

a ring-like permanent magnet attached to said lower surface of said flange within said internal space;

a plurality of stators attached within said internal space of said flange in concentric positions in face-to-face relationship with said ring-like permanent magnet; and a plurality of armature coils wound on each of said stators.

2. The spindle motor of the disk apparatus according to claim 1, wherein said disk is attached to said flange by bonding.

3. The spindle motor of the disk apparatus according to claim 1, wherein said plurality of stators are disposed radially outwardly of said ring-like permanent magnet.

4. The spindle motor of the disk apparatus according to claim 4, wherein said ring-like permanent magnet is provided on a radially outer portion of said flange.

5. The spindle motor of the disk apparatus according to claim 1, wherein said plurality of stators are disposed radially inwardly of said ring-like permanent magnet.

6. The spindle motor of the disk apparatus according to claim 6, wherein said ring-like permanent magnet is provided on a radially inner portion of said flange.

7. The spindle motor of the disk apparatus according to claim 6, wherein said ring-like permanent magnet is composed of a polar anisotropic magnet, of which generally only an inner peripheral portion is substantially magnetized.

8. A magnetic disk apparatus comprising:

a magnetic disk;

a magnetic head for writing and reading data to and from said magnetic disk;

an actuator for moving said magnetic head in a radial direction of said magnetic disk;

a spindle motor for rotating said magnetic disk, wherein said spindle motor includes:

a spindle shaft adapted to be secured to a housing;

a spindle hub rotatably attached to said spindle shaft, said spindle hub including a flange, said flange being defined by an upper surface, a lower surface, an outer diameter, and an internal space located radially inwardly of said outer diameter adjacent said lower surface;

a disk defined by a minor diameter and a major diameter, wherein said minor diameter is less than both said major diameter and said outer diameter of said flange, and said disk being attached to said lower surface of said flange;

a ring-like permanent magnet attached to said lower surface of said flange within said internal space;

a plurality of stators attached within said internal space of said flange in concentric positions in face-to-face relationship with said ring-like permanent magnet; and a plurality of armature coils wound on each of said stators.

9. The magnetic disk apparatus according to claim 8, wherein said magnetic disk is attached to said flange by bonding.

10. The magnetic disk apparatus according to claim 8, wherein said plurality of stators are disposed radially outwardly of said ring-like permanent magnet.

11. The magnetic disk apparatus according to claim 8, wherein said ring-like permanent magnet is provided on a radially outer portion of said flange.

12. The magnetic disk apparatus according to claim 8, wherein said plurality of stators are disposed radially inwardly of said ring-like permanent magnet.

13. The magnetic disk apparatus according to claim 12, wherein said ring-like permanent magnet is provided on a radially inner portion of said flange.

14. The magnetic disk apparatus according to claim 13, wherein said ring-like permanent magnet is composed of a polar anisotropic magnet, of which generally only an inner peripheral portion is substantially magnetized.

* * * * *

UNITED STATES PATENT AND TRADEMARK OFFICE
CERTIFICATE OF CORRECTION

PATENT NO. : 5,502,605
DATED : March 26, 1996
INVENTOR(S) : Myokan

It is certified that error appears in the above-indentified patent and that said Letters Patent is hereby corrected as shown below:

Column 1, line 1, delete "OF" and insert --FOR A--.

Column 1, line 14, after "power" insert --from--.

Column 1, line 37, delete "5 with" and insert --5,--.

Column 1, line 38, after "mounted" insert --to--.

Column 2, line 12, delete "a" and insert --the--.

Column 2, line 45, delete "by" and insert --with--.

Column 3, line 24, delete "a smaller quantity of" and insert --less--.

UNITED STATES PATENT AND TRADEMARK OFFICE
CERTIFICATE OF CORRECTION

PATENT NO. : 5,502,605
DATED : March 26, 1996
INVENTOR(S) : Myokan

It is certified that error appears in the above-indentified patent and that said Letters Patent is hereby corrected as shown below:

Column 4, line 57, before "magnetic" insert --the--.

Column 4, lines 59-60, delete "forth motor of a " and insert --motor of the--.

Column 4, line 65, delete "the outer" and insert --an outer--.

Column 5, line 1, delete "a" and insert --the--.

Column 5, line 2, delete "an" and insert --the--.

Column 5, line 8, delete "increment in terms of a quantity of" and insert --increase in--.

UNITED STATES PATENT AND TRADEMARK OFFICE
CERTIFICATE OF CORRECTION

PATENT NO. : 5,502,605
DATED : March 26, 1996
INVENTOR(S) : Myokan

It is certified that error appears in the above-indentified patent and that said Letters Patent is hereby corrected as shown below:

Column 5, line 10, delete "outside" and insert --outwardly--.

Column 5, line 11, delete "a larger quantity of" and insert --more--.

Column 5, line 12, delete "A" and insert --the--.

Column 5, line 13, delete "conduces to a reduction of" and insert --reduces the--.

Column 5, line 16, before "modification" insert --a--.

Column 5, line 24, delete "a" and insert --the--.

Column 5, line 26, before "diameter" insert --outer--.

Column 5, line 36, delete "pieces of".

Column 5, line 39, delete "on each of" and insert --around--.

UNITED STATES PATENT AND TRADEMARK OFFICE
CERTIFICATE OF CORRECTION

PATENT NO. : 5,502,605
DATED : March 26, 1996
INVENTOR(S) : Myokan

It is certified that error appears in the above-indentified patent and that said Letters Patent is hereby corrected as shown below:

Column 5, line 47, delete "inward" and insert --inwardly--.

Column 6, line 9, delete "brings" and insert --increases--.

Column 6, line 15, delete "S-pole" and insert --8-pole--.

Column 7, line 22, delete "4" and insert --3--.

Column 7, line 28, delete "6" and insert --5--.

Signed and Sealed this

Twentieth Day of May, 1997

Attest:

BRUCE LEHMAN

Attesting Officer

Commissioner of Patents and Trademarks